United States Patent [19]

Bruner

[11] 4,260,182
[45] Apr. 7, 1981

[54] COMPRESSION FITTING

[75] Inventor: Rodney J. Bruner, St. Louis, Mo.

[73] Assignee: Emerson Electric Co., St. Louis, Mo.

[21] Appl. No.: 100,657

[22] Filed: Dec. 5, 1979

[51] Int. Cl.³ .............................................. F16L 19/08
[52] U.S. Cl. ..................................... 285/23; 285/341; 285/382.7
[58] Field of Search .................. 285/382.7, 341, 23, 285/343, 342

[56] References Cited

U.S. PATENT DOCUMENTS

| | | | |
|---|---|---|---|
| 1,805,666 | 5/1931 | Hukill | 285/382.7 X |
| 1,959,079 | 5/1934 | Holt | 285/343 X |
| 2,029,325 | 2/1936 | Kocher | 285/382.7 X |
| 2,059,920 | 11/1936 | Weatherhead, Jr. | 285/341 |
| 2,150,042 | 3/1939 | Shultz | 285/382.7 X |
| 2,182,811 | 12/1939 | Kocher | 285/342 X |
| 2,350,017 | 5/1944 | Davis | 285/382.7 X |
| 3,219,367 | 11/1965 | Franck | 285/382.7 X |
| 3,471,181 | 10/1969 | Fuentes | 285/382.7 X |
| 4,022,497 | 5/1977 | Kotsakis | 285/382.7 X |

Primary Examiner—Thomas F. Callaghan
Attorney, Agent, or Firm—Paul A. Becker, Sr.

[57] ABSTRACT

A two-piece compression fitting comprises a driving screw and a symmetrical sleeve adapted to be pre-assembled to a threaded receptacle for later connection of coupling tubing. One end of the driving screw is provided with a thin-wall extension for accepting a central cylindrical portion of the sleeve in a press-fit manner so as to provide and maintain co-axial alignment of the inner bores of the screw and sleeve whereby the coupling tubing can be easily inserted therethrough.

5 Claims, 3 Drawing Figures

COMPRESSION FITTING

This invention relates to compression fittings for thin metal tubing.

The use of compression fittings for attaching gas or liquid-carrying metal tubing to a threaded receptacle is well known. Such compression fittings generally comprise a compression sleeve or ferrule and a driving screw, both having inner or through bores with diameters slightly larger than that of the tubing. When utilizing such a compression fitting, the tubing extends through the inner bores of the driving screw and sleeve and into the threaded receptacle. The driving screw is threadedly connected to the threaded receptacle, compressing the sleeve around the tubing and against a seating surface within the threaded receptacle to effect a gas or liquid-tight seal.

The prior art discloses various designs of compression fittings both of the so-called two-piece type, wherein the sleeve is separate from the driving screw, and of the so-called one-piece frangible tye, wherein the sleeve is initially integral with the driving screw and is broken away from the screw during attachment of the tubing.

While both type of fittings, when properly manufactured and installed, are capable of effecting satisfactory seals, an objectionable feature of the one-piece fitting, when compared with the two-piece fitting, is the torque characteristic of the one-piece fitting. Specifically, a relatively large torque, approximately 25 to 50 inch-pounds, must be applied to the one-piece fitting to cause the sleeve portion to break away from the driving portion. The torque then drops essentially to zero, after which the proper torque must then be applied to compress the sleeve. The relatively large torque to effect separation of the screw and sleeve can be misinterpreted by the installer as being the torque for compressing the sleeve. The result of such a misinterpretation is a leaking connection.

Because of the above described torque characteristic of the one-piece frangible fitting, the two-piece fitting is often preferred. However, a problem exists when using twopiece fitting in an application wherein the fitting is pre-assembled to the threaded receptacle for later insertion of the tubing, the problem being maintaining the necessary co-axial alignment of the inner bores of the driving screw and sleeve to permit insertion of the tubing.

A commonly-used two-piece fitting includes a symmetrical sleeve having a larger diameter centrl portion and downwardly sloping surfaces on both sides thereof, the same symmetrical sleeve design utilized in the present invention, and a driving screw having a rounded driving portion for forcing the sleeve against a rounded seat in the threaded receptacle, the same driving and seating arrangement as in the present invention. In applications wherein this fitting is pre-assembled for later insertion of the tubing, co-axial alignment of the fitting is initially obtained by inserting a mandrel through the inner bores of the driving screw and sleeve into the threaded receptacle and slightly tightening the screw. The mandrel is then removed and the device incorporating the fitting is shipped to another location for insertion of the tubing. During shipment, the driving screw sometimes vibrates loose, allowing the sleeve to cock so that its inner bore and the inner bore of the driving screw are no longer co-axially aligned. This misalignment prevents the tubing from being inserted thus requiring the additional expense of removing the driving screw and sleeve and placing them on the tubing.

The prior art, in U.S. Pat. No. 2,182,811, discloses several two-piece compression fittings directed towards providing and maintaining the above-described co-axial alignment. While some of the constructions illustrated therein include what appears to be a press-fit between the driving screw and sleeve, a feature of the present invention, it is not clear as to how the driving screw of sleeve or both are particularly constructed to initiate the press-fit. Also, such constructions employ asymmetrical sleeves. Because the sleeves are asymmetrical, they require special handling during assembly to insure proper orientation of the sleeve, thus increasing the cost.

An object of the present invention is to provide a generally new and improved two-piece compression fitting comprising a driving screw and sleeve, the fitting being constructed to provide and maintain co-axial alignment of the inner bores of the screw and sleeve whereby the fitting can be pre-assembled to a threaded receptacle for later connection of coupling tubing.

A further object is to provide a generally new and improved two-piece compression fitting which comprises a driving screw and a symmetrical sleeve, the driving screw having an extended portion on one end thereof for accepting a central portion of the sleeve in a press-fit manner so as to align the inner bores of the driving screw and sleeve.

Yet a further object is to provide a two-piece compression fitting as in the preceding paragraph wherein the sleeve has a sloping surface on both sides of the central portion, one of the sloping surfaces cooperating with the extended portion of the driving screw for facilitating pressing of the sleeve into the driving screw.

Other objects and advantages of the present invention will become apparent from the following description when read in connection with the accompanying drawings.

In the drawings:

FIG. 1 is a cross-sectional view of the two-piece compression fitting of this invention and of a typical threaded receptacle, shown prior to connection of the fitting of the threaded receptacle;

FIG. 2 is a cross-sectional view of the two-piece compression fitting and threaded receptacle of FIG. 1, shown after the driving screw and sleeve have been pressed together and connected to the threaded receptacle with the aid of a mandrel; and FIG. 3 is a cross-sectional view of the fitting and threaded receptacle shown after tubing has been inserted and the fitting has been tightened to effect the desired seal.

DESCRIPTION OF THE PREFERRED EMBODIMENT

Figure 1:
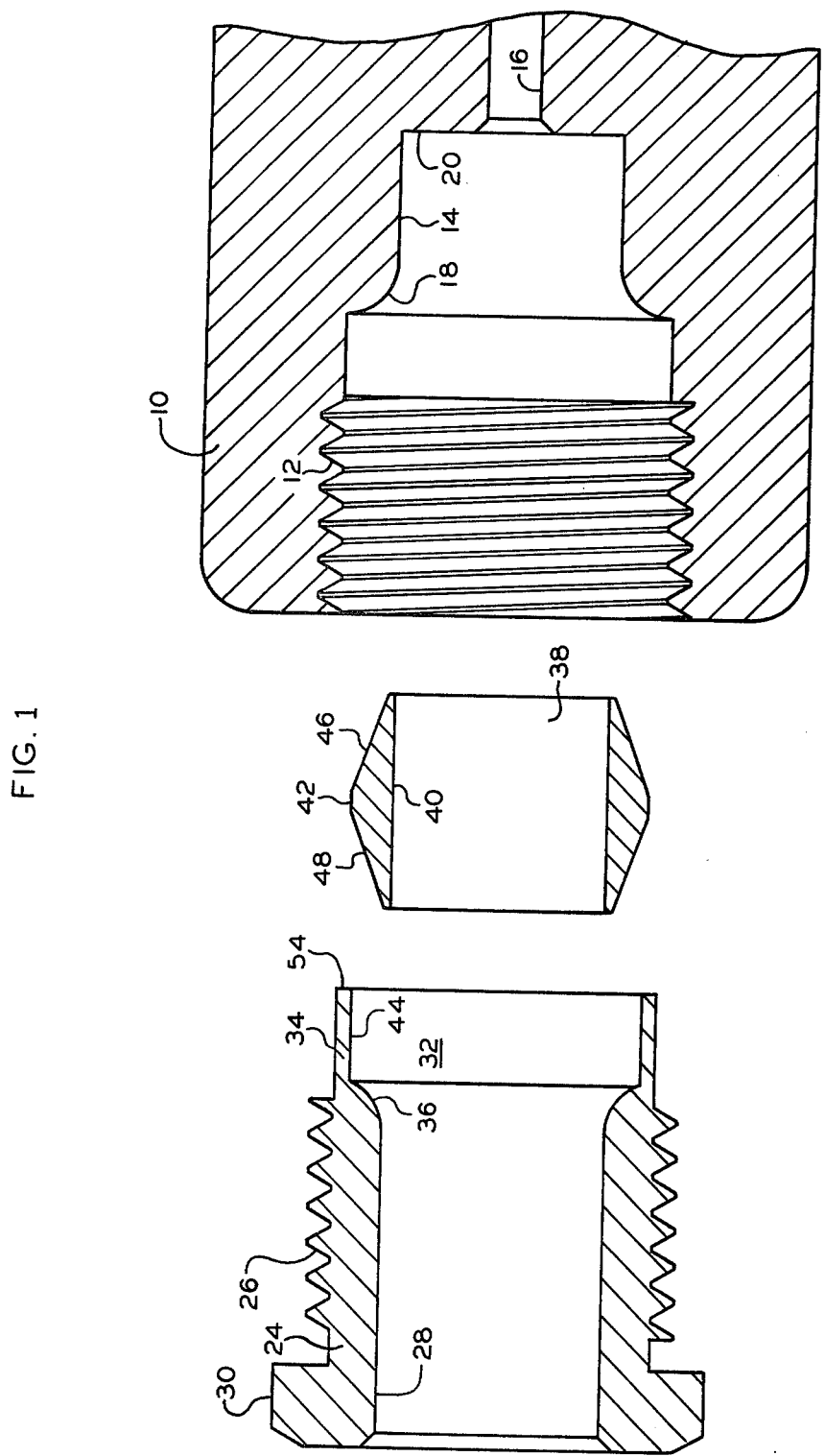

Referring to FIG. 1, a threaded receptacle for accepting the compression fitting of this invention comprises a body member 10, typically a gas valve casting or an orifice screw. Body member 10 has a threaded opening 12, a cavity 14, and a gas or liquid-carrying passage 16. Cavity 14 has a rounded portion 18 and a bottom wall 20.

A driving screw 24 has a threaded shank portion 26 for cooperation with threaded opening 12 of body member 10. Screw 24 has an inner through bore 28 having a diameter slightly larger than the outside diameter of the tubing to be connected. One end of screw 24 has a hexagonal head 30 for facilitating tightening thereof. The other end of screw 24 is provided with a recess 32 defined by a thin-wall cylindrical portion 34 which extends beyond threaded shank portion 26, and a rounded portion 36 intermediate cylindrical portion 34 and inner bore 28.

Adapted to be secured in a press-fit manner to cylindrical portion 34 of screw 24 is a symmetrical sleeve or ferrule 38 having an inner bore 40 of approximately the same diameter as that of inner bore 28 of screw 24. Sleeve 38 includes a narrow central cylindrical portion 42 having a diameter slightly larger, approximately three thousands of an inch, than the diameter of the inside wall 44 of screw portion 34. Sleeve 38 is also provided with downwardly sloping surfaces 46 and 48 extending from central portion 42.

When it is desired to pre-assemble screw 24 and sleeve 38 to body member 10 for later insertion of tubing, it is necessary that the inner bores 28 and 40 of screw 24 and sleeve 38, respectively, be co-axilly aligned and remain co-axially aligned until the tubing is installed. The preferred method for providing this alignment is to install screw 24 and sleeve 38 in body member 10 with the aid of a mandrel.

Figure 2:
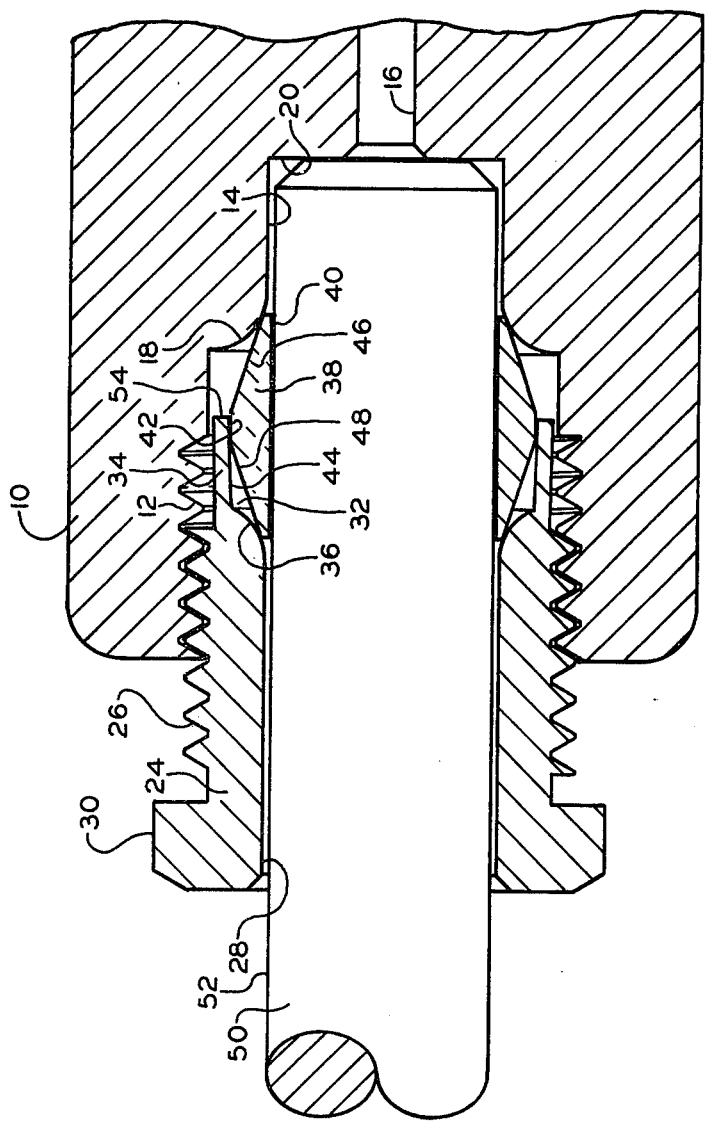

Referring to FIG. 2, screw 24 and sleeve 38 are placed on a mandrel 50 having a diameter 52 approximately the same as, or a few thousands of an inch larger than, the outside diameter of the tubing to be later connected. The mandrel 50 is inserted in body member 10 until one end thereof abuts bottom wall 20 of body member 10. Driving screw 24 is then tightened.

As screw 24 is tightened, an outer edge 54 of screw portion 34 bears against the sloping surface 48 of sleeve 38, causing sleeve 38 to slide longitudinally along mandrel 50. Sleeve 38 is moved in this manner until its sloping surface 46 abuts around portion 18 of cavity 14. Subsequent tightening of screw 24 causes edge 54 of screw portion 34 to move upwardly on sloping surface 48 whereby the diameter of the inside wall 44 of screw portion 34 is forcibly increased. It is noted that such an increase in diameter is facilitated by the cam action of edge 54 of screw 24 bearing against sloping surface 48, and by the fact that screw portion 34 is thin-walled.

When the diameter of the inside wall 44 of screw portion 34 has been increased to the diameter of central portion 42 of sleeve 38, the central portion 42 is pressed into recess 32 and is retained by the inside wall 44. It is noted that while the entire longitudinally extending portion of the inside wall 44 is not increased in diameter an equal amount, at least a portion near edge 54 is sufficiently increased to effect this press fit. While sleeve 38, in this portion, is sufficiently secured to screw 24 to prevent moving or cocking with respect to screw 24, screw 24 is then further tightened, causing the central portion 42 of sleeve 38 to be displaced an additional amount inwardly from edge 54 of screw portion 34, until sloping surface 48 of sleeve 38 abuts rounded portion 36 of screw 24. By abutting rounded portion 36, sleeve 38 is even more firmly secured against moving or cocking with respect to screw 24. The torque required to be applied to head 30 of screw 24 for effecting this pressed connection will vary somewhat due to part tolerances. I have found that a torque somewhat less than 10 inch-pounds, generally between 7½ and 9½ inch-pounds, will insure that the pressed connection is made.

After the screw 24 and sleeve 38 have been pressed together as described above, they are in the positions shown in FIG. 2. Mandrel 50 is then removed. The above method of press-fitting sleeve 38 into recess 32 of screw 24 does not distort the inner bores 28 and 40 of screw 24 and sleeve 38, respectively, so that the mandrel 50 can be easily removed.

After mandrel 50 is removed, body member 10 can be shipped to another location for insertion of tubing. With screw 24 and sleeve 38 pressed together as described, sleeve 38 will not move or cock with respect to screw 24 even if screw 24 should loosen during shipment.

Figure 3:
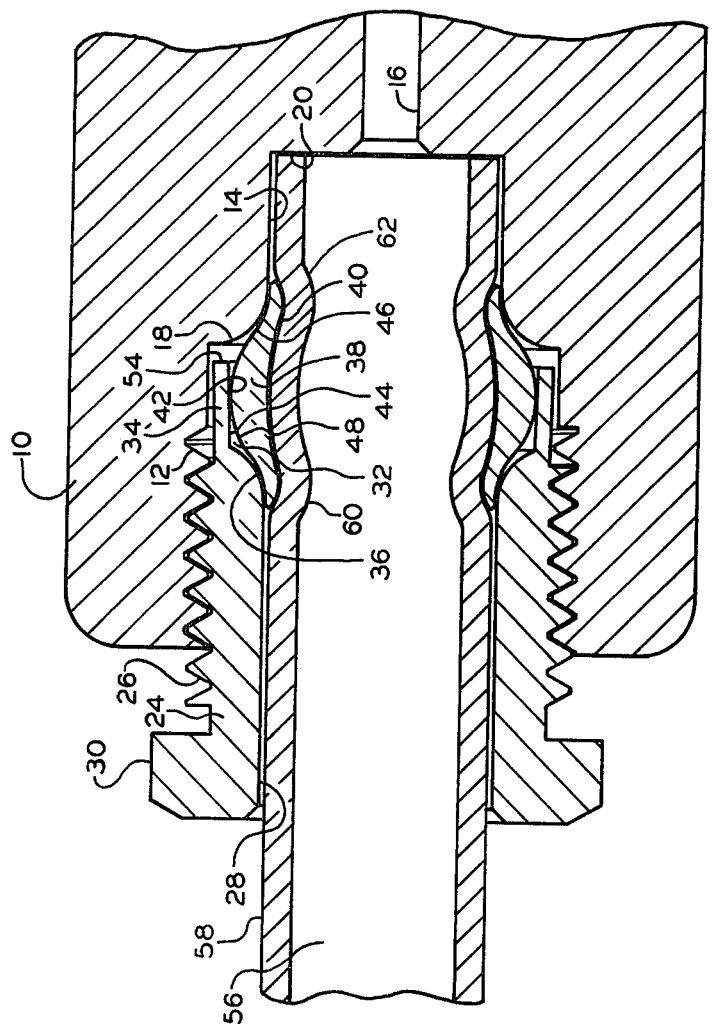

Referring to FIG. 3 when body member 10 is received at the location where the tubing is to be connected, a thin-wall tube 56 having an outside diameter 58 is inserted through co-axially aligned inner bores 28 and 40 of screw 24 and sleeve 38, respectively, until one end of tube 56 abuts the bottom wall 20 of cavity 14. Screw 24 is then tightened to effect the desired seal.

As scrw 24 is tightened, sleeve 38 initially rotates with screw 24 as rounded portion 36 of screw 24 drives sleeve 38 against rounded portion 18 of cavity 14. When one end of sleeve 38 is welded sufficiently between outside diameter 58 of tube 56 and rounded portion 18 of cavity 14 so that the wedging force is greater than the force retaining central portion 42 of sleeve 38 within inside wall 44 of screw portion 34, sleeve 38 no longer rotates with screw 24.

As tightening the screw 24 is continued, sloping surface 46 of sleeve 38 is distorted against rounded portion 18 of cavity 14 to provide a desired seal therebetween. Also, rounded portion 36 of screw 24 causes sloping surface 48 of sleeve 38 to be distorted. The distortion of sleeve 38 caused by the cooperation of rounded portion 36 of screw 24 with sloping surface 48 of sleeve 28 and of rounded portion 18 of cavity 14 with sloping surface 46 of sleeve 38 effects the desired seal between the inner bores 28 and 40 of screw 24 and sleeve 38, respectively, and the outside diameter 58 of tube 56. The distortion of sleeve 38 also causes the outer ends of sleeve 38 to form cylindrical grooves in tube 56 at 60 and 62, respectively, for securing tube 56 within body member 10.

I claim:

1. In a two-piece compression fitting,
    a driving screw having an inner through bore and a recess in one end defined by a thin-wall cylindrical portion and a driving portion spaced inwardly from an outer-most edge of said cylindrical portion;
    a symmetrical sleeve having an inner through bore of substantially the same diameter as that of said driving screw, a cylindrical central portion, and sloping surfaces extending downwardly from said central portion;
    said central portion of said sleeve having a diameter slightly larger than the diameter of an inside wall of said cylindrical portion of said screw; and
    one of said sloping surfaces of said sleeve being cooperative with said outermost edge of said cylindrical portion of said screw, when said screw and sleeve are pressed together and said inner bores of said screw and sleeve are co-axially aligned, for forcibly increasing said diameter of said inside wall to said diameter of said central portion of said sleeve whereby said sleeve is pressed into said recess of said screw and is retained in co-axial alignment therein by said inside wall of sid cylindrical portion of said screw.

2. The two-piece compression fitting claimed in claim 1 wherein said sleeve, upon continued pressing thereof, is further movable within said recess of said screw until said one of said sloping surfaces of said sleeve abuts said driving portion of said screw.

3. An improved two-piece compression fitting of the type having a driving screw and sleeve adapted to be pre-assembled, with the inner bores thereof co-axially aligned, to a threaded receptacle for later connection of coupling tubing, wherein the improvement comprises:
- a thin-wall cylindrical portion on one end of the screw;
- the sleeve being a symmetrical sleeve having a cylindrical central portion and downwardly sloping surfaces on both sides thereof;
- said central portion of said sleeve having a diameter slightly larger than the diameter of an inside wall of said cylindrical portion of said screw; and
- one of said sloping surfaces of said sleeve being cooperative with an outermost edge of said cylindrical portion of said screw for forcibly increasing said diameter of aid inside wall of said cylindrical portion of said screw for effecting a press-fit connection between said central portion of said sleeve and said inside wall.

4. A two-piece compression fitting claimed in claim 3 wherein a torque applied to said screw for ensuring that said press-fit connection is made is less than 10 inch-pounds.

5. The two-piece compression fitting claimed in claim 4 wherein said torque is in the range of $7\frac{1}{2}$ to $9\frac{1}{2}$ inch-pounds.

* * * * *